(12) United States Patent
Paluch, Jr. et al.

(10) Patent No.: US 6,223,268 B1
(45) Date of Patent: Apr. 24, 2001

(54) SYSTEM AND METHOD FOR WRITING SPECIFIC BYTES IN A WIDE-WORD MEMORY

(75) Inventors: Edward John Paluch, Jr., Santa Clara; Kuei-Cheng Lin, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/229,496

(22) Filed: Jan. 8, 1999

(51) Int. Cl.[7] .................................................. G06F 12/04
(52) U.S. Cl. ..................... 711/201; 712/300; 365/195; 365/238.5; 711/163
(58) Field of Search ................................. 711/205, 201, 711/163; 712/300; 365/195, 238.5

(56) References Cited

U.S. PATENT DOCUMENTS

| | | | |
|---|---|---|---|
| 5,241,663 | 8/1993 | Rohwer | 395/425 |
| 5,465,374 * | 11/1995 | Dinkjian et al. | 711/219 |
| 5,553,048 | 9/1996 | Maeda | 369/60 |
| 5,577,228 | 11/1996 | Banerjee et al. | 395/467 |

\* cited by examiner

*Primary Examiner*—Jack A. Lane
(74) *Attorney, Agent, or Firm*—Gregory J. Koerner; Simon & Koerner LLP

(57) ABSTRACT

The present invention comprises an efficient system and method for writing specific bytes in a wide-word configured memory. A memory controller is configured to write from a wide-word databus to specific bytes in a wide-word addressed memory. The memory controller uses wide-word memory addresses which possess resolution capable of addressing specific bytes, and, in addition, data mask bytes which inhibit data write operations to those bytes in a wide-word which are not intended to be written in a given memory write operation. In one embodiment of the present invention, data mask bytes are created by shifting predetermined bit patterns to the right by an amount calculated by arithmetically combining bits in the wide-word memory address. A flexible individual address generating scheme allows memory write operations which do not depend upon the memory write operation's data boundaries being evenly aligned with the boundaries of wide-words.

30 Claims, 9 Drawing Sheets

SYSTEM AND METHOD FOR WRITING SPECIFIC BYTES IN A WIDE-WORD MEMORY

BACKGROUND OF THE INVENTION

1. Field of the Invention

This invention relates generally to improvements in memory addressing and specifically to a system and method for writing to arbitrary individual byte locations contained within a wide-word organized memory.

2. Description of the Background Art

Digital audio and digital video are two technologies that must rapidly manipulate vast amounts of data. A common architectural approach to facilitate this data manipulation is to organize the memory so that it transfers the data in wide words. In this manner, many bytes of data may be transferred simultaneously during a single memory access.

In an exemplary application, the controller for a Digital Video Disk (DVD) transfers data using a 64-bit wide word (i.e. a word containing eight 8-bit bytes). This memory architecture allows the rapid transfer of digital audio and digital video. However, the foregoing rapid transfer of data results in a significant loss of flexibility.

Digital audio and video are often transferred as a composite digital bitstream. Embedded within the digital audio and video bitstream may be additional information called auxiliary data. This auxiliary data may arrive at irregular times and consist of irregular numbers of bytes. For this reason, the auxiliary data may not be sent directly as it arrives to a synchronous dynamic-random-access-memory (SDRAM) in even multiples of eight bytes. Sending data to memory in non-even multiples of eight bytes at a time is not possible in the customary wide-word architecture. While the address word may contain address information capable of specifying individual bytes contained within a wide word, attempting to write to these individual bytes causes problems. If the data desired to be written does not evenly fit the eight-byte wide word, then attempting to write to any byte within that wide word causes unintended data writes into bytes other than the desired bytes. The result is that the desired data is successfully written, but the other bytes then contain corrupted data.

To avoid the foregoing, some systems add considerable additional logic to the circuit which receives the bitstream. This additional logic may include additional local data buffering and other circuitry. The local buffering allows for larger amounts of auxiliary data to accumulate prior to writing to wide-word memory. When a transfer of this buffered data to wide-word memory is desired, the additional logic first reads from the wide-word memory in the target area, then assembles wide-words which contain both the buffered data and the recently-read data which should remain undisturbed. When these wide-words are subsequently written to wide-word memory, the overall effect is to write specific bytes into the wide-word memory without corrupting adjacent bytes.

The above method does allow the writing of specific bytes into a wide-word memory, but at the cost of complexity. An exemplary implementation of the above additional logic added to the circuit which receives the bitstream requires on the order of 10,000 additional gates. Therefore, there exists a need for a system and method which allows directly writing specific bytes into a wide-word memory without the complexity of supporting additional buffering and attendant multiple memory accesses.

SUMMARY OF THE INVENTION

The present invention includes a system and method for writing specific bytes in a wide-word memory. In one embodiment of the present invention, a wide-word memory controller includes a memory arbitrator, a memory address generator, and a synchronous dynamic-random-access-memory (SDRAM) interface. In this embodiment, the memory address generator includes a data mask byte (DQM) logic for generating values for DQM. These DQMs include individual data mask bits numbered DQM0 through DQM7. The individual DQM0 through DQM7 may inhibit writing to their corresponding byte locations within a wide-word in memory.

In one embodiment of the present invention, composite 32-bit memory addresses are used for data transfers. These 32-bit addresses contain a byte address field which may address individual bytes in a wide-word memory, and also a byte-count field for determining how many bytes remain to be transferred. The DQM logic calculates two values, called a start-mask and an end-mask, which are intended for use either individually or together as DQM values depending upon circumstances.

The memory arbitrator sends the memory address generator a 32-bit memory address. The DQM logic calculates the first start-mask by shifting 1111111100000000 to the right by an arithmetic combination of values in the 32-bit address, and then taking the eight least-significant bits. The DQM logic also calculates the first end-mask by shifting 0000000001111111 by another arithmetic combination of values in the 32-bit address, and then taking the eight least-significant bits. Then the DQM logic of the memory address generator determines whether the memory write operation includes only one, or more than one, wide-words by testing to see if a third arithmetic combination of values in the 32-bit address is less than 8.

If the answer is no, then the DQM logic determines that the current memory write operation contains multiple wide-words. Then the memory address generator sends the current start-mask as data mask bits DQM0 through DQM7 to the SDRAM interface, along with the current individual address. The SDRAM interface uses the current individual address and the data mask bits DQM0 through DQM7 to perform four 16-bit data write operations to external SDRAM, with two of the data mask bits being asserted during each 16-bit data write operation.

After the SDRAM interface has performed the four 16-bit data write operations, memory address generator then updates the byte count and byte address. Then the DQM logic calculates the current values for start-mask and end-mask. After updating these values, the DQM logic determines if the next wide-word is the last wide-word. If the answer is no, then the sub-process of memory writing with the current start-mask as data mask bits DQM0 through DQM7 repeats.

Conversely, if the answer is yes, then the memory address generator sends the current end-mask as data mask bits DQM0 through DQM7 to SDRAM interface along with the current individual address. The SDRAM interface uses the current individual address and the data mask bits DQM0 through DQM7 to perform four 16-bit data write operations to external SDRAM, with two of the data mask bits being asserted during each 16-bit data write operation. Because this is the last wide-word of the current memory write operation, the memory write operation then ends.

The above discussion assumes that the memory write operation covers multiple wide-words. Conversely, if the memory write operation covers only one wide-word, the DQM logic performs a bitwise-or function on the current start-mask and end-mask. The least-significant eight bits of the resulting word form the bit-or-mask for the memory write operation. Memory address generator then sends data mask bits DQM0 through DQM7 to SDRAM interface along with the individual address. The SDRAM interface uses the individual address and the data mask bits DQM0 through DQM7 to perform four 16-bit data write operations to external SDRAM, with two of the data mask bits being asserted during each 16-bit data write operation. Because there is only one wide-word considered in this memory write operation, the memory write operation then ends.

DETAILED DESCRIPTION OF THE PREFERRED EMBODIMENT

The present invention relates to an improvement in memory addressing flexibility. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for efficiently writing specific bytes in a wide-word configured memory. In one embodiment, a memory controller is configured to write from a wide-word databus to specific bytes in a wide-word addressed memory. The memory controller uses wide-word memory addresses which possess an address field that can address individual bytes within the wide-word, and, in addition, data mask bytes which inhibit data write operations to those wide-word bytes which are not intended to be written in a given memory write operation. In one embodiment of the present invention, data mask bytes are created by shifting predetermined bit patterns to the right by an amount calculated by arithmetically combining bits in the wide-word memory address. A flexible individual address generating scheme allows memory write operations which do not depend upon the memory write operation's data boundaries being evenly aligned with the boundaries of wide-words.

Figure 1:
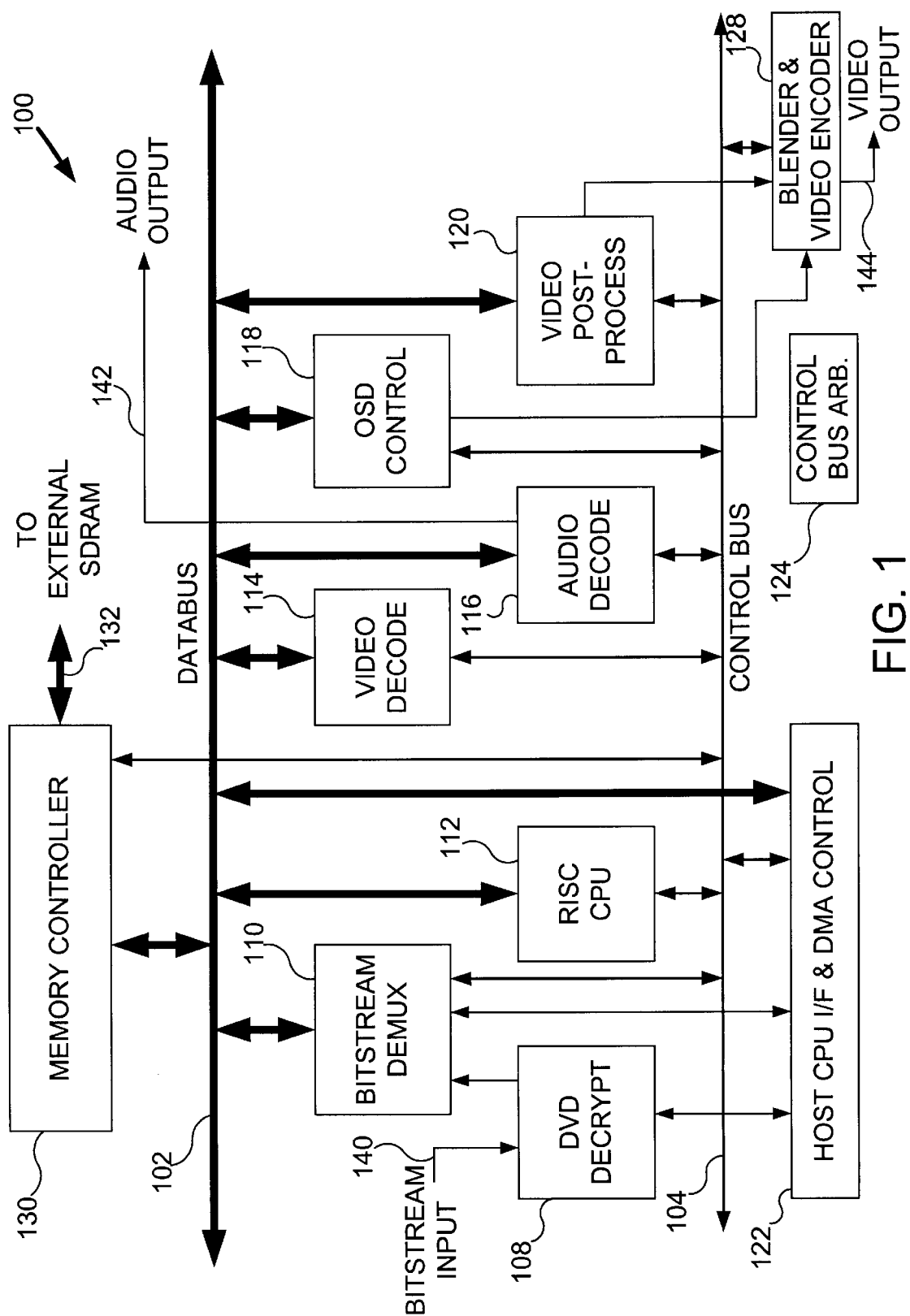
FIG. 1 is a block diagram for one embodiment of a controller for a digital audio and video player, in accordance with the present invention.

Referring now to FIG. 1, a block diagram for one embodiment of a controller 100 for a digital audio and video player is shown, in accordance with the present invention. However, alternate embodiments of the present invention may be used wherever there exists a necessity for writing to specific bytes in a wide-word memory. Controller 100 may be used, for example, as the controller for a digital video disk (DVD) player or for a digital video broadcast (DVB) set-top-box. Controller 100 preferably includes two primary data busses: databus 102 and control bus 104. Many of the functional components of controller 100 connect to both databus 102 and control bus 104. These functional components may include DVD decryption 108, bitstream demultiplexor 110, reduced instruction set computer (RISC) central processing unit (CPU) 112, video decoder 114, audio decoder 116, on-screen display (OSD) controller 118, video post-processing filter 120, host CPU interface and direct memory access (DMA) controller 122, control bus arbitrator 124, blender and video encoder 128, and memory controller 130.

In one embodiment of the present invention, databus 102 transfers data in 64-bit wide-words (or eight 8-bit bytes) on 64 physical data lines. In alternate embodiments, the width of the wide-words may be 32 bits, 128 bits, or any other width necessitated by a given system architecture. The logical addressing space used to transfer data in 64-bit wide-words is called databus space. In one embodiment of the present invention, databus 102 transfers compressed bitstreams, video reference and reconstructed pixel data, OSD graphics data, and several other data types between the functional components and external synchronous dynamic random-access-memory (SDRAM, not shown) via memory controller 130. In alternate embodiments, the memory may be of types other than SDRAM, such as static random-access-memory (SRAM) or other forms of dynamic-random-access-memory (DRAM). Databus 102 also includes a 7-bit wide channel address bus for determining the target of transfers when requested by numerous functional components.

Control bus 104 allows RISC CPU 112 or an external host CPU (not shown) to control the functional components via read/write registers via host CPU interface and DMA controller 122. Control bus 104 transfers data in 16-bit words on 16 physical data lines. Control bus arbitration 124 determines the order of transfers on control bus 104. Control bus 104 also transfers 32-bit addresses for use in databus 102 memory read and write operations in the form of two 16-bit words.

Memory controller 130 controls data transfers between the databus 102 and the external SDRAM. Memory controller 130 also controls databus 102. The detailed operation of memory controller 130 is further described in conjunction with FIGS. 2 through 9 below.

Digital audio, digital video, and other digital data enters controller 100 at DVD decryption 108 via bitstream input signal 140. DVD decryption 108 decrypts copy-protected data when the bitstream is derived from a DVD. When the bitstream is derived from DVB, DVD decryption 108 passes the data through without alteration. In either case, the data is presented to bitstream demultiplexor 110 which parses the bitstream into digital audio, digital video, and other digital data. These individual parsed data types are then sent to external synchronous dynamic random-access memory (SDRAM) (not shown) via databus 102, memory controller 130, and external SDRAM connection 136. Note that the exemplary embodiment of the present invention is primarily concerned with this data writing from bitstream demultiplexor 110 to external SDRAM.

RISC CPU 112 communicates with, and controls, other functional components of controller 100 via databus 102 and control bus 104. RISC CPU 112 also communicates with an external CPU (not shown) via host CPU interface and DMA controller 122 for passing user interface data.

Video decoder 114 decompresses compressed digital video data that is stored temporarily in external SDRAM (not shown), and sends the resulting decompressed digital video data to video post-processing filter 120. Audio decoder 116 likewise decompresses compressed digital audio data, stored temporarily in external SDRAM, and sends the resulting decompressed digital audio data from controller 110 via audio output signal 142 in the form of multi-channel pulse-code modulated (PCM) digital audio data.

Multi-function OSD controller 118 generates graphics patterns for superimposing over decoded video data, and additionally may produce sub-picture graphics such as floating cursors. Video post-processing filter 120 resizes image data and also filters the image data for letterbox displays. Video post-processing filter 120 additionally may change the chroma format and perform blending of four alpha planes.

Blender and video encoder 128 takes video data from OSD controller 118 and video post-processing filter 120 and combines the data to form the actual digital video signal to be displayed. Blender and video encoder 128 then encodes this actual digital video signal in one of several analog video signal formats, such as national television standards committee (NTSC) or phase alternate line (PAL), in either composite video or component video format.

Figure 2:
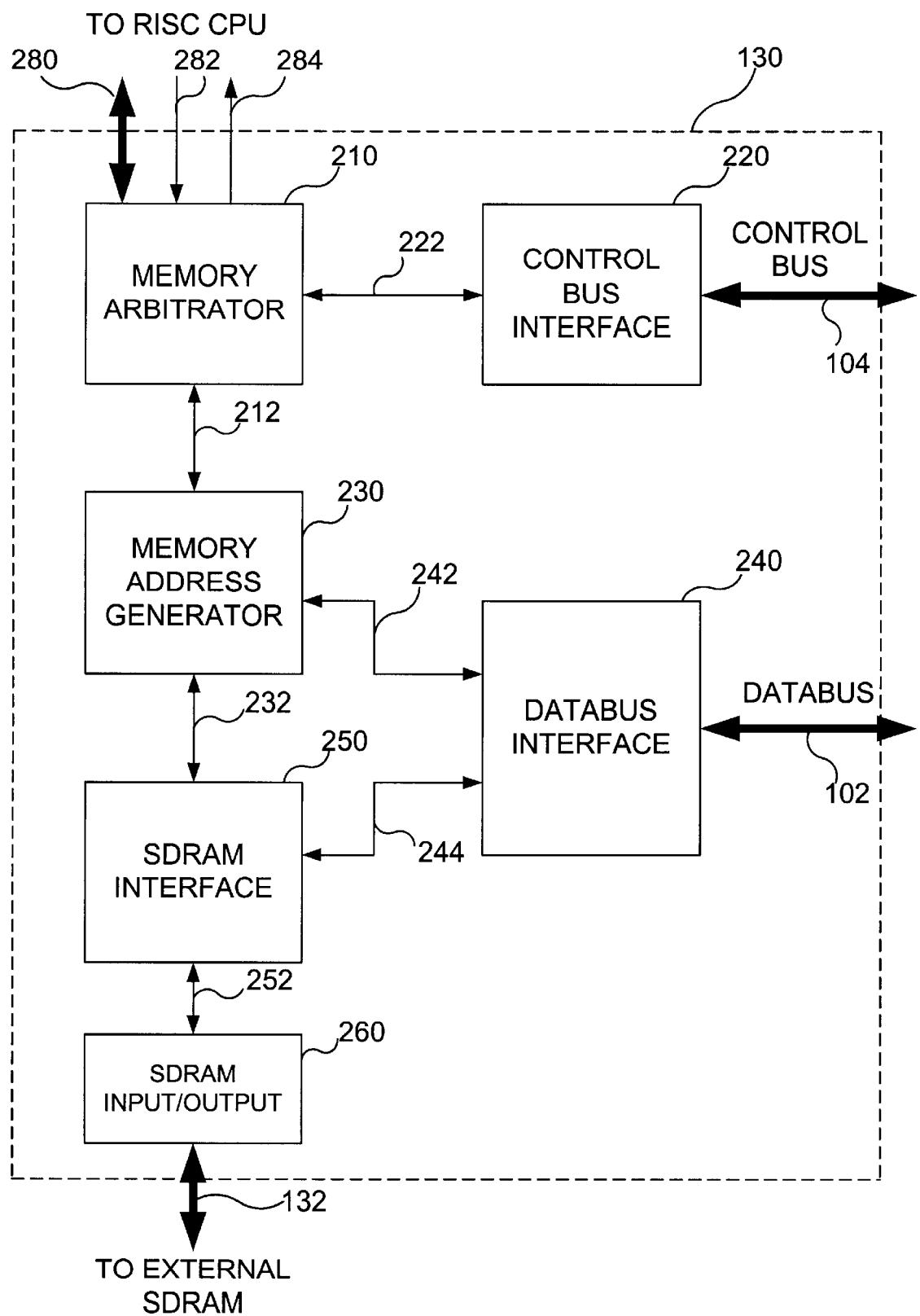
FIG. 2 is a block diagram for one embodiment of the memory controller of FIG. 1, in accordance with the present invention.

Referring now to FIG. 2, a block diagram for one embodiment of the memory controller 130 of FIG. 1 is shown, in accordance with the present invention. In the preferred embodiment, memory controller 130 primarily transfers 64-bit wide-word data from databus 102 to an external SDRAM (not, shown) via 16-bit SDRAM connection 132. In one embodiment, databus 102 is clocked at 27 MHz and SDRAM connection 132 is clocked at 94.5 MHz. In alternate embodiments the wide-words could be 32 bits wide, 128 bits wide, or any other width necessitated by the system architecture, and the physical memory connection may be of any width.

Memory arbitrator 210 determines the order in which functional components attached to databus 102 may transfer data to or from SDRAM. The arbitration scheme used by memory arbitrator 210 to select that transfer order is configurable by registers which can be written via control bus 104. Control bus interface 220 receives configuration information from control bus 104 and transfers the configuration information to memory arbitrator 210.

Memory arbitrator 210 also receives a 32-bit address on a private address bus connecting RISC CPU 112 to memory controller 130. The private address bus includes direct-memory access [DMA] address lines 280, DMA request line 282, and DMA busy line 284. When memory arbitrator 210 determines that a particular request for memory access should be granted, memory arbitrator 210 delivers the 32-bit address and the respective channel number to memory address generator 230. (Each functional component on databus 102 is preferably assigned a unique number, called a channel number, for data routing. The 32-bit address delivered to memory address generator 230 contains a dynamic-random-access-memory (DRAM) byte address (DBA), and also a byte-count minus one (BC−1) which shows how many bytes are to be transferred during the memory access. Details of the 32-bit address are discussed below in conjunction with FIG. 4.

During a memory write cycle, memory address generator 230 generates one or more individual addresses onto signal line 232, and also generates an outgoing channel number signal on signal line 242 so that databus interface 240 may receive data words from the appropriate functional component. Upon receipt of its corresponding channel number signal, the functional component sends its data via databus 102 to write buffers in SDRAM interface 250. The addresses generated by memory address generator 230 expand the single incoming 32-bit address into a number of individual addresses. Each of these individual addresses specifies the location of a 64-bit wide-word in databus 102 virtual memory space.

The SRDAM used in the present invention need not be physically configured as a 64-bit wide-word memory. The SDRAM need only be virtually configured as 64-bit wide-word memory. In one embodiment, the SDRAM is physically configured as a 16-bit data word memory. SDRAM interface 250 transfers each 64-bit wide-word write datum from the write buffers in SDRAM interface 250 to SDRAM input/output 260 as four 16-bit words. SDRAM input/output 260 contains interface circuitry, including small buffers, to write the four 16-bit word transfers into SDRAM.

Figure 3:
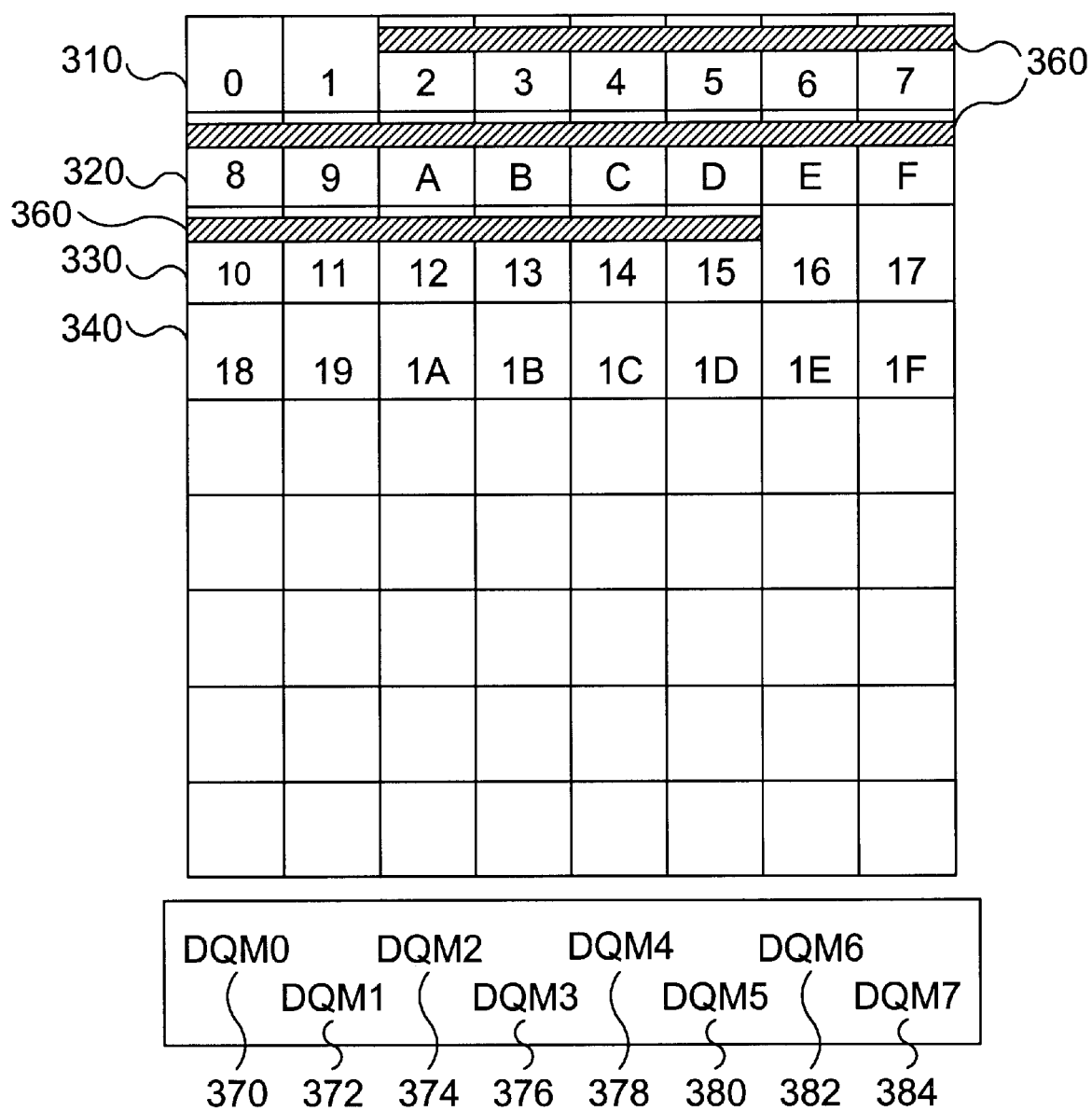
FIG. 3 is an exemplary memory configuration map, in accordance with one embodiment of the present invention.

Referring now to FIG. 3, an exemplary memory configuration map is shown, in accordance with one embodiment of the present invention. The FIG. 3 embodiment illustrates 64-bit wide-word databus 102 virtual memory space. Each square in each row represents an 8-bit byte of physical memory, and each row represents a single 64-bit wide-word of databus 102 space memory. For example, wide-word 310 contains eight physical data bytes addressed 0 hexadecimal (hex) through 7 hex. If a functional component on databus 102 writes to wide-word 310, then SDRAM interface 250 performs four sequential write operations to physical memory: write bytes 0 and 1, write bytes 2 and 3, write bytes 4 and 5, and finally write bytes 6 and 7. Because the foregoing transfer starts with the first byte in a 64-bit wide-word and concludes with the last byte in a 64-bit wide-word, this transfer is called an aligned transfer.

Previous memory circuits could perform aligned transfers but not unaligned transfers. An exemplary unaligned transfer 360 is indicated by the shaded bar. Unaligned transfer 360 covers bytes 2 through 15. In unaligned transfer 360, it is desired to write new data into bytes 2 through 15, but to leave unaltered the contents of bytes 0, 1, 16, and 17. Without the present invention, attempting the data write operations of unaligned transfer 360 causes writing to and subsequent data corruption of bytes 0, 1, 16, and 17.

Therefore, in one embodiment of the present invention, memory controller 130 uses data mask bits DQM0 370 through DQM7 384. Each data mask bit corresponds to a byte location in each wide-word in 64-bit wide-word databus 102 virtual memory space. DQM0 370 corresponds to the first byte in a 64-bit wide-word, DQM1 372 corresponds to the second byte, DQM2 374 corresponds to the third byte, DQM3 376 corresponds to the fourth byte, DQM4 378 corresponds to the fifth byte, DQM5 380 corresponds to the sixth byte, DQM6 382 corresponds to the seventh byte, and DQM7 384 corresponds to the eighth byte. Data mask bits DQM0 370 through DQM7 384 may inhibit the physical writing of data to the corresponding bytes during a 64-bit wide-word memory write cycle. In one embodiment, when a data mask bit is equal to 0, data writing to the corresponding byte is permitted: when a data mask bit is equal to 1, data writing to the corresponding byte is inhibited. For convenience, data mask bits DQM0 370 through DQM7 384 may be collectively referred to as data mask byte DQM= [DQM0 370, DQM1 372 372, DQM2 374, DQM3 376, DQM4 378, DQM5 380, DQM6 382, DQM7 384].

An exemplary use of data mask bits DQM0 370 through DQM7 384 may occur with unaligned transfer 360. Unaligned transfer 360 includes transferring data to portions of wide-words 310, 320, and 330. When memory controller 130 allows unaligned transfer 360 to proceed, then memory address generator 230 receives a 32-bit address from memory arbitrator 210. This address will be converted by memory address generator 230 into three sequential write addresses, corresponding to wide-words 310, 320, and 330. SDRAM interface 250 further converts these three sequential write addresses into four 16-bit transfers each in physical memory space.

Exemplary unaligned transfer 360 must avoid writing to bytes 0 and 1 of wide-word 310, so during the data write operation to wide-word 310 data mask byte DQM= [11000000]. This value of DQM inhibits the physical writing to bytes 0 and 1, yet permits physical writing to bytes 2 through 7. Then, when unaligned transfer 360 writes to wide-word 320, all eight bytes may be written, so data mask byte DQM=[00000000]. During the final transfer unaligned transfer 360 must avoid writing to bytes 16 and 17, so during the data write operation to wide-word 330 data mask byte DQM=[00000011]. This value of DQM inhibits the physical writing to bytes 16 and 17.

As mentioned above, databus 102 address space is 64-bits wide, even though the external SDRAM transfers data 16 bits at a time. SDRAM interface 250 sends four 16-bit data writes to external SDRAM for each 64-bit data write received from databus 102. For this reason SDRAM interface 250 receives a data mask byte DQM from memory address generator 230, but only asserts two physical data mask signals, SDDQM0 and SDDQM1, to the external SDRAM via SDRAM input/output 260. These data mask signals SDDQM0 and SDDQM1 take signal levels corresponding first to DQM0 370 and DQM1 372, then DQM2 374 and DQM3 376, then DQM4 378 and DQM5 380, and finally DQM6 382 and DQM7 384, respectively. For the rest of this detailed description, it will be assumed that whenever data mask bytes are discussed, they will be asserted to physical external SDRAM, two mask bits at a time, over data mask signals SDDQM0 and SDDQM1.

Figure 4:
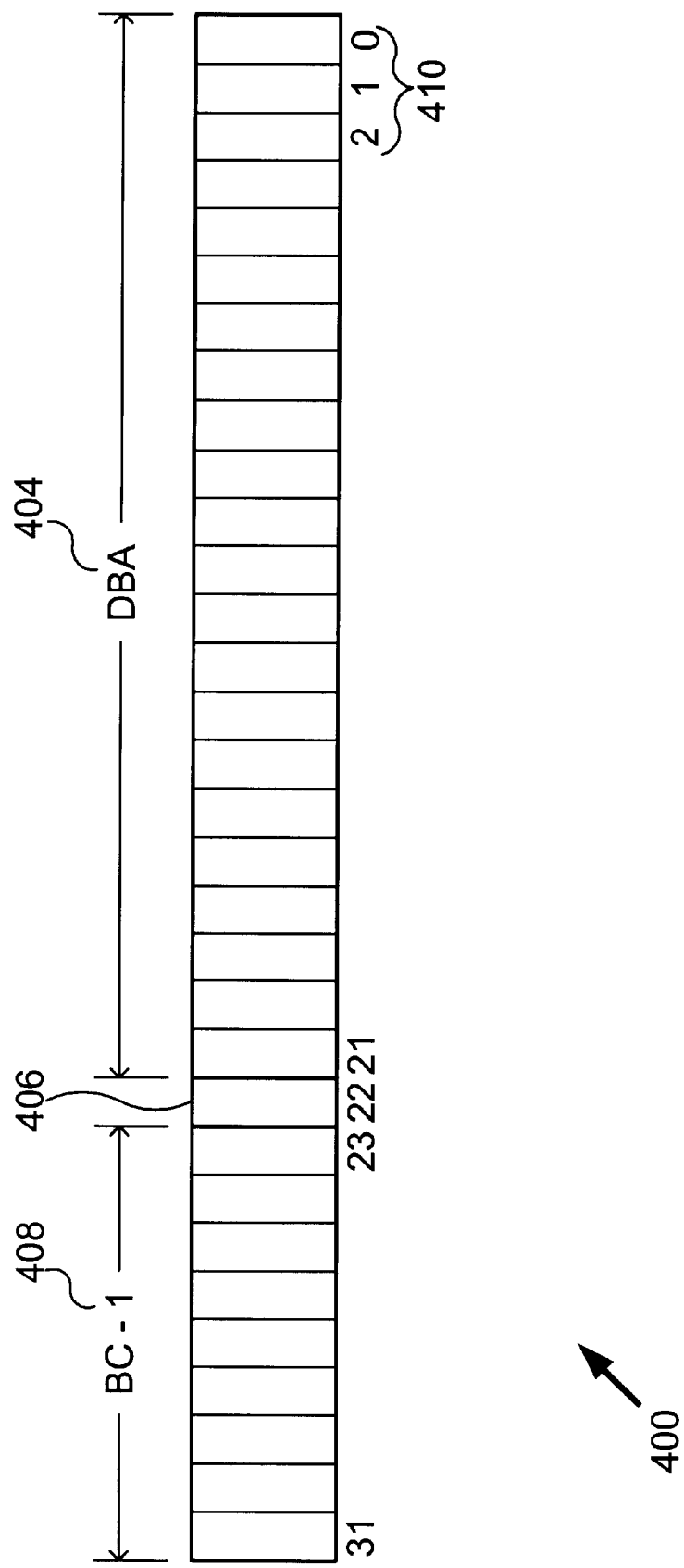
FIG. 4 is a memory address bit-allocation diagram, in accordance with one embodiment of the present invention.

Referring now to FIG. 4, a 32-bit address 400 bit allocation diagram is shown, in accordance with one embodiment of the present invention. RISC CPU 112 sends 32-bit address 400 via a private address bus to memory controller 130. The private address bus includes direct-memory access [DMA] address lines 280, DMA request line 282, and DMA busy line 284. Thirty-two-bit address 400 describes a requested read or write operation from a functional component on databus 102 to SDRAM via memory controller 130. Thirty-two-bit address 400 includes three specific fields: DRAM byte address (DBA) 404, flag bit 406, and byte count minus one (BC–1) 408. In alternate embodiments of the present invention, other memory address bit allocations may be used.

DBA 404 contains a binary number that represents the individual byte address of a particular byte in memory. As an example, in the memory configuration map of FIG. 3, the value contained in DBA would be 8 hex for the first byte of wide-word 320, and the value contained in DBA would be 1A hex for the third byte of wide-word 340. In the FIG. 4 embodiment, DBA 404 represents the byte address of the first byte transferred in the requested memory operation, whether or not that byte occurs at the boundary of a wide-word.

Flag bit 406 contains a bit which represents information concerning specific modes of a requested read or write operation. It may signal where to select a channel number or whether to perform a field or frame operation.

(BC–1) 408 contains a binary number that represents one fewer than the number of bytes left to be transferred in the requested memory operation. In the present embodiment, the value of (BC–1) is one less than a multiple of eight for an aligned transfer, because aligned transfers evenly move 8-byte wide-words. Another feature of an aligned transfer is that the three least-significant bits 410 of DBA 404 are 0, because aligned transfers start on the first byte of a wide-word. For convenience, the three least-significant bits 410 of DBA 404 may also be called DBA[2:0].

Figure 5:
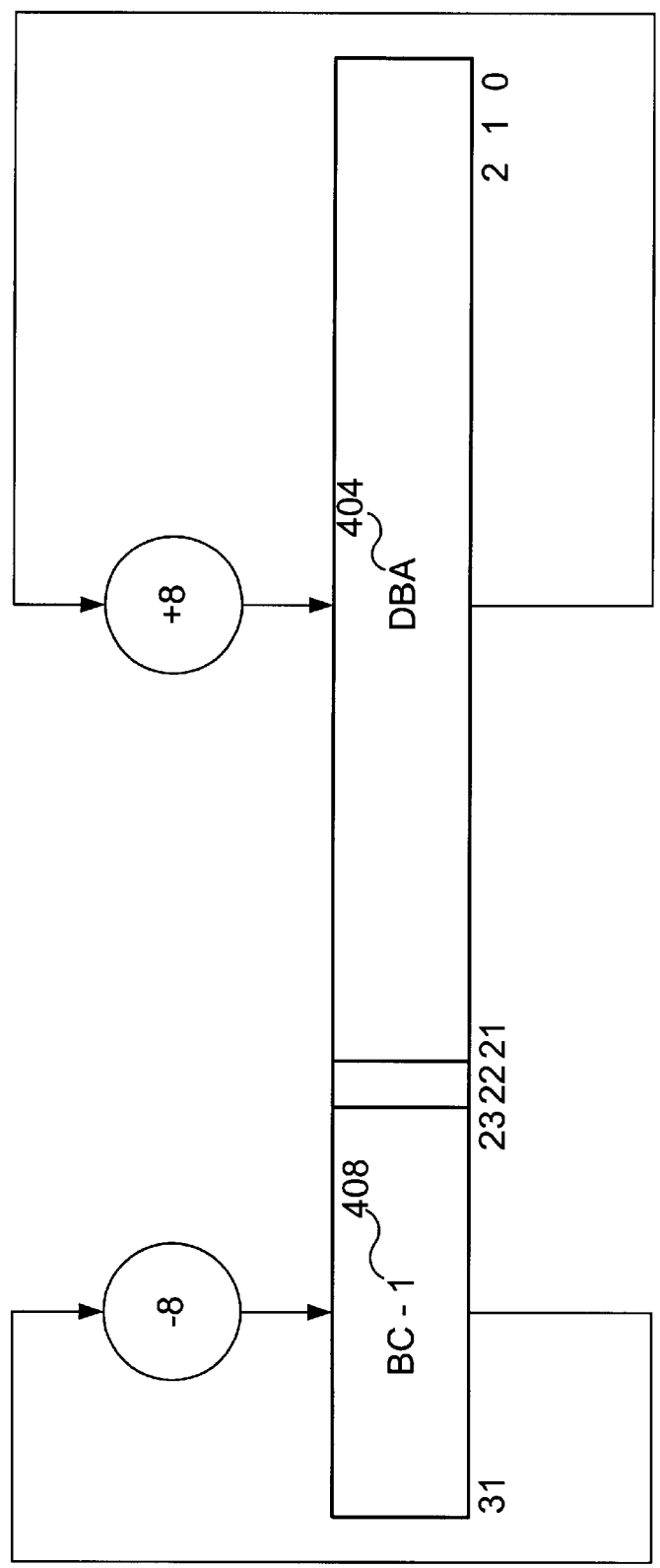
FIG. 5 is a diagram for updating the memory address bits of FIG. 4, in accordance with one embodiment of the present invention.

Referring now to FIG. 5, a diagram for updating the memory address bits of FIG. 4 is shown, in accordance with one embodiment of the present invention. In the FIG. 5 embodiment, an aligned transfer to or from memory is shown in the process carried out by memory address generator 230. Recall that memory address generator 230 receives a 32-bit address 400 from memory arbitrator 210, and then generates sequential individual addresses for the requested memory. FIG. 5 illustrates how memory arbitrator 210 calculates the sequential individual addresses.

When an aligned transfer memory write operation begins, memory address generator 230 transfers the contents of DBA 404 to SDRAM interface 250. SDRAM interface 250 then initiates four 16-bit data transfers to the eight physical bytes comprising the 64-bit wide-word whose address is the contents of DBA 404. After memory address generator 230 transfers the contents of DBA 404 to SDRAM interface 250, memory address generator 230 tests the value contained in (BC–1) 408.

If the value contained in (BC–1) 408 is greater than or equal to 0, memory address generator 230 generates a subsequent individual address by adding 8 to the current contents of DBA 404 and subtracting 8 from (BC–1) 408. Memory address generator 230 then sends the new contents of DBA 404 to SDRAM interface 250, which again initiates four 16-bit data transfers to the eight physical bytes comprising the 64-bit wide-word whose address is the new contents of DBA 404.

When the value contained in (BC–1) is less than 0, memory address generator 230 generates no subsequent individual address, and the aligned transfer memory write operation ends.

Figure 6:
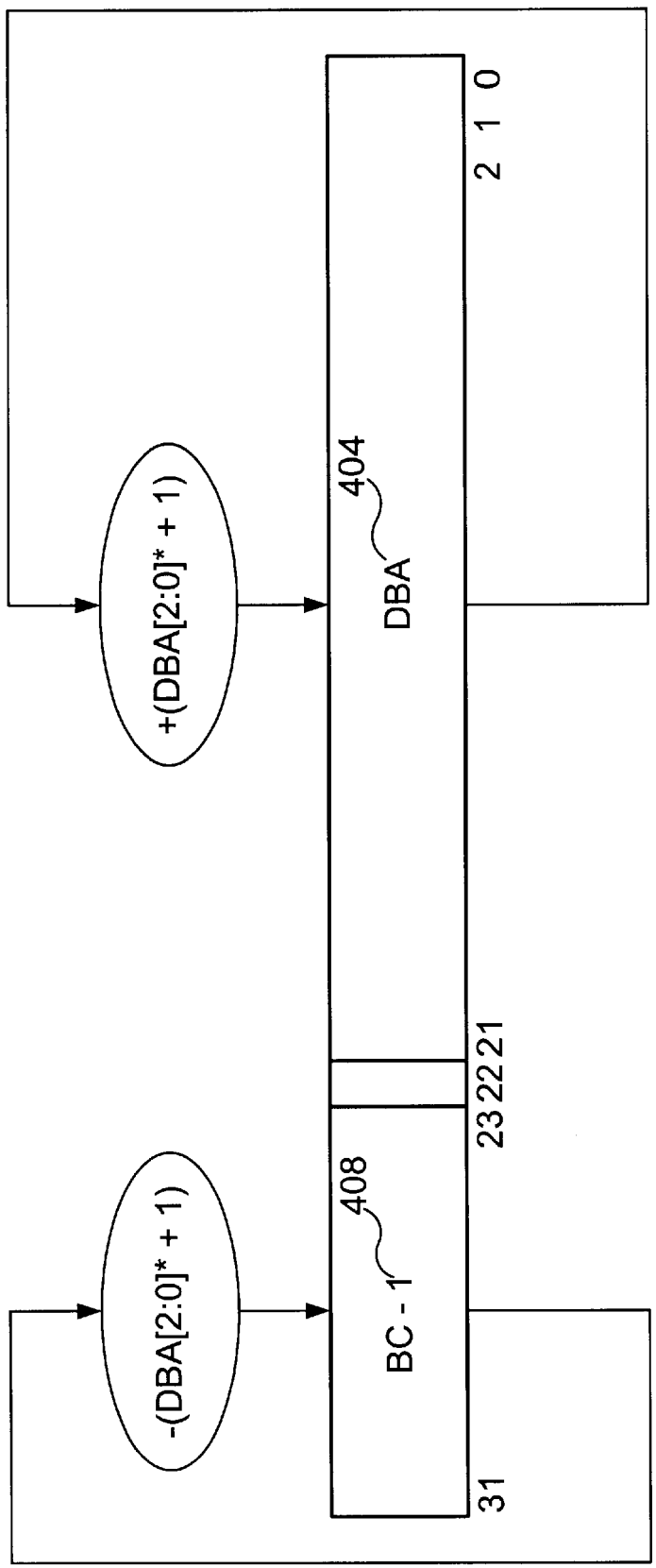
FIG. 6 is a diagram showing flexible updating of the memory address bits of FIG. 4, in accordance with one embodiment of the present invention.

Referring now to FIG. 6, a diagram showing flexible updating of the memory address bits of FIG. 4 is shown, in accordance with one embodiment of the present invention. In the FIG. 6 embodiment, an unaligned transfer to memory is shown in the process carried out by memory address generator 230. In one embodiment of the present invention, memory controller 130 is not limited to controlling aligned transfers, but may also control unaligned transfers. In an unaligned transfer, DBA[2:0] is not equal to 0. The first byte written is not at the beginning of a wide-word and therefore is not divisible by 8 hex. Therefore, memory address generator 230 may add an amount less than 8 hex to generate the address of a subsequent individual address.

In one embodiment of the present invention, memory address generator 230 sends the initial value of DBA 404 to SDRAM interface 250, and then tests the value contained in (BC−1) 408. If the value contained in (BC−1) 408 is greater than or equal to 0, then memory address generator 230 adds (DBA[2:0]*+1) to the contents of DBA 404, where DBA [2:0]* is the one's complement of DBA[2:0]. Adding (DBA [2:0]*+1) to the contents of DBA 404 makes subsequent individual addresses aligned with the boundaries of the wide-words, because DBA[2:0]*+1+DBA[2:0]=8 hex and hence DBA is divisible by 8 hex. Memory address generator 230 also subtracts the same amount DBA[2:0]*+1 from (BC−1) 408. Memory address generator 230 sends the new value of DBA 404 to SDRAM interface 250, and the FIG. 6 process repeats until such time as the value contained in (BC−1) 408 is less than 0. Then, the unaligned transfer memory write operation ends.

Figure 7:
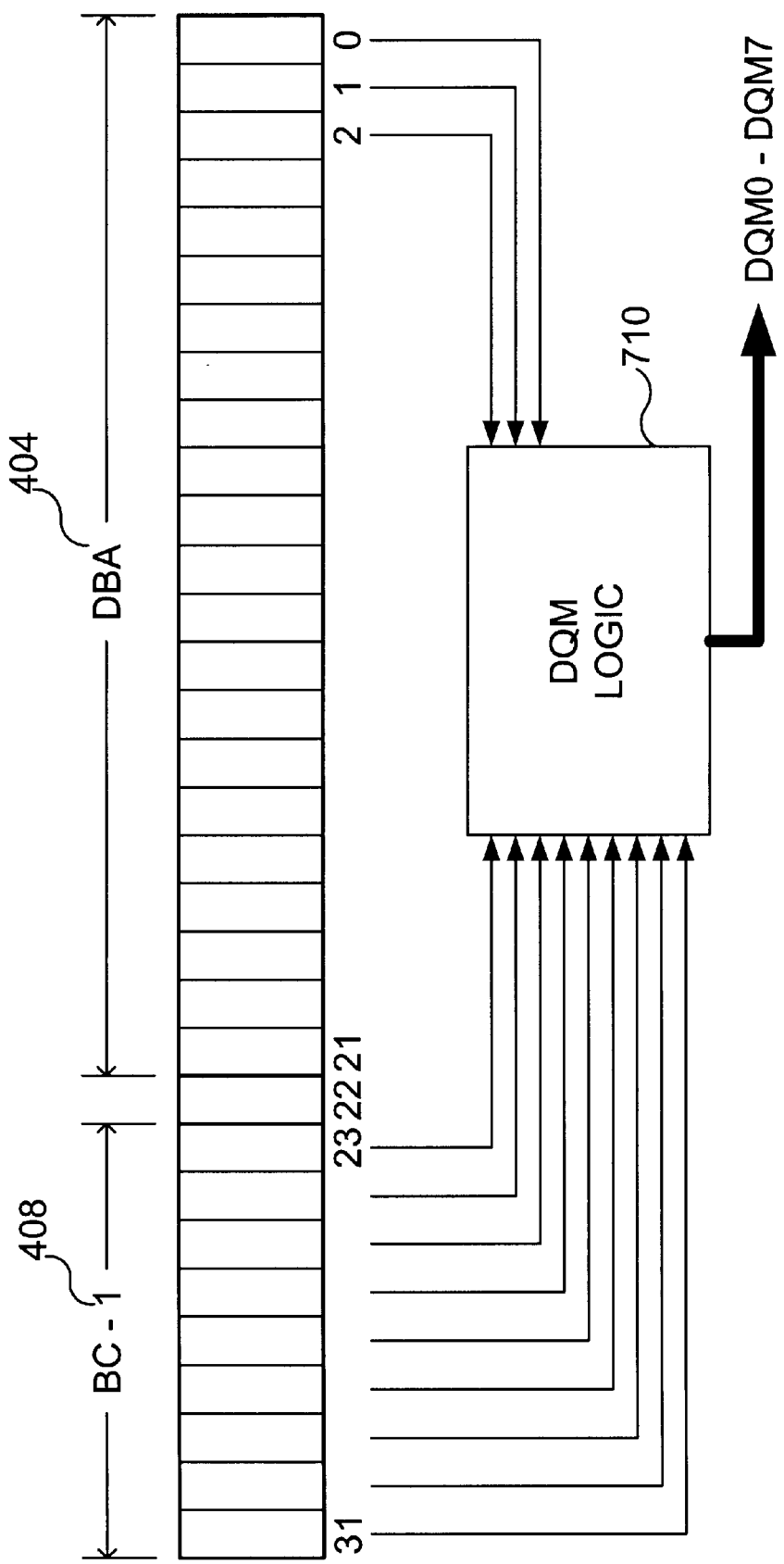
FIG. 7 is a diagram showing a derivation of data mask bits DQM0 through DQM7, in accordance with one embodiment of the present invention.

Referring now to FIG. 7, a diagram showing a derivation of data mask bits DQM0 370 through DQM7 384 is shown, in accordance with one embodiment of the present invention. Data mask bits DQM0 370 through DQM7 384 may inhibit data writing to byte locations outside the boundaries of an unaligned transfer.

In one embodiment of the present invention, memory address generator 230 includes a hardware module called DQM logic 710. DQM logic 710 creates two special values for data mask byte DQM for the 32-bit address 400 and for each subsequent individual address. The special values of data mask byte DQM are called start-masks and end-masks. The names start-mask and end-mask correspond generally to their intended use.

In one embodiment, for each address, DQM logic 710 generates a start-mask by taking the 16 bit word FF00 hex (1111111100000000 binary) and shifting it logically to the right by the binary number currently contained in DBA[2:0]. The least-significant 8 bits of the resulting word may be used as the start-mask.

In the exemplary memory write operation of FIG. 3, for the initial 32-bit address, DBA[2:0]=010. Shifting 1111111100000000 binary to the right 010 times yields xx11111111000000 binary, where the letter x is used here and subsequently below to represent an unspecified binary digit. The least-significant 8 bits of this resulting word are 11000000 binary, which was shown to be the desired DQM value for wide-word 310 in the discussion of FIG. 3 above.

At the same time DQM logic 710 is generating the DQM value for each start-mask, it also generates a corresponding end-mask. DQM logic 710 generates an end-mask by taking the 16 bit word 007F hex (0000000001111111 binary) and shifting it logically to the right by the sum of the binary number currently contained in (BC−1)[2:0] plus the binary number currently contained in DBA[2:0]. The least-significant 8 bits of the resulting word may be used as the end-mask.

Finishing the exemplary memory write operation of FIG. 3, for wide-word 330, the value of (BC−1)[2:0] for the final individual address equals 101. It is noteworthy that the value of DBA[2:0] for the final individual address equals 000, which is true whenever the starting wide-word is not the same ending wide-word. The sum of (BC−1)[2:0] and DBA[2:0] equals 101. Shifting 0000000001111111 to the right 101 times yields xxxxx0000000011, where the letter x represents an unspecified binary digit. The least-significant 8 bits of this resulting word are 00000011 binary, which was shown to be the desired DQM value for wide-word 330 in the discussion of FIG. 3 above.

After DQM logic 710 determines the start-mask and end-mask for initial 32-bit address 400, DQM logic 710 next determines if the memory write operation takes place within a single wide-word. If the initial value of (BC−1) is less than or equal to the number of bytes from the byte addressed by DBA to the end of the first wide-word, then the entire memory write operation takes place within a single wide-word. Otherwise, the memory write operation takes place within more than one wide-word, as was the case with the exemplary unaligned transfer of FIG. 3.

In the exemplary unaligned transfer of FIG. 3, DQM logic 710 determines that the memory write operation takes place within more than one wide-word. Memory address generator 230 then sends the current start-mask to SDRAM interface 250 for masking bytes in the starting wide-word 310 of the memory write operation.

Figure 8:
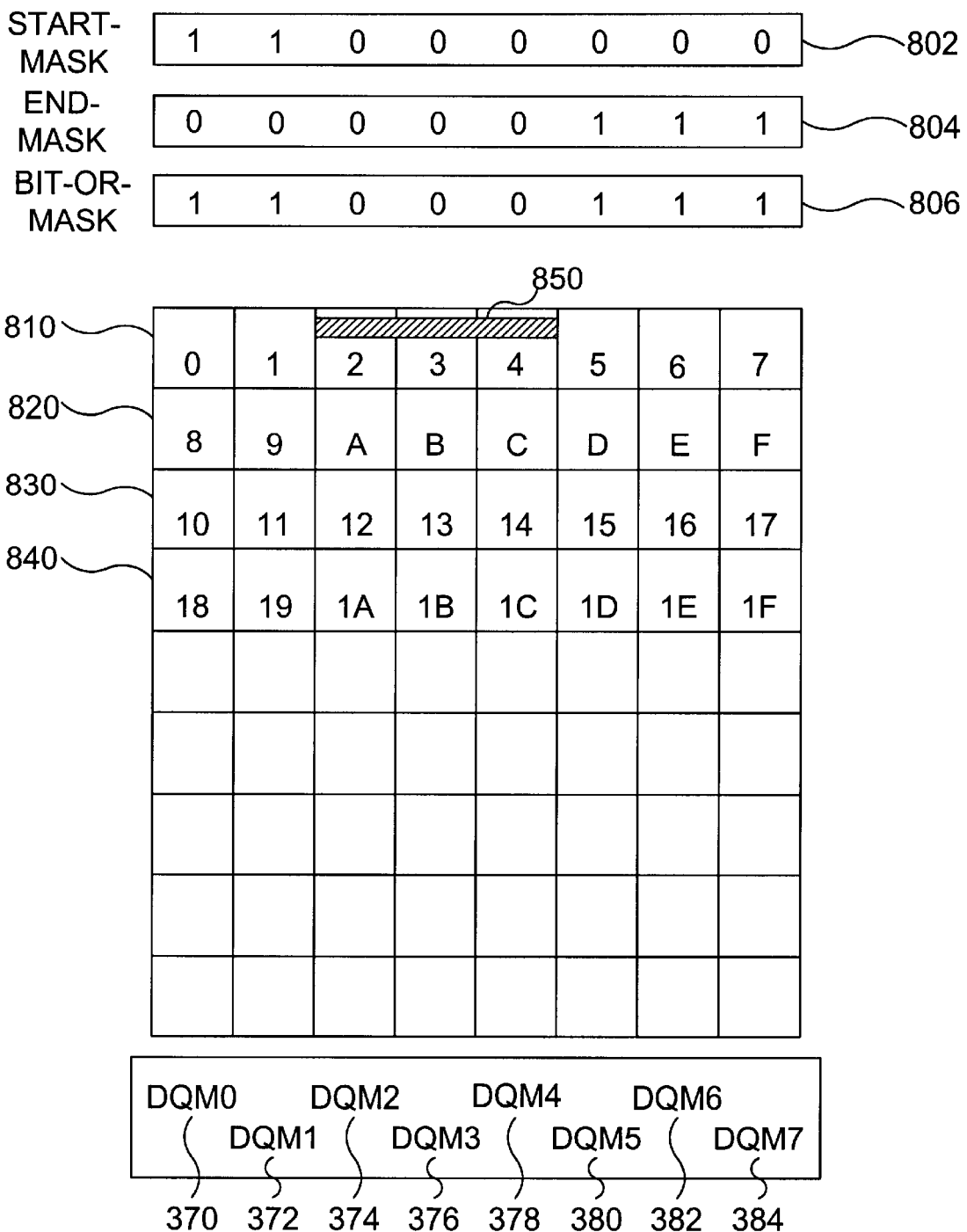
FIG. 8 is an exemplary memory configuration map showing a derivation of a single mask using a bitwise-or function, in accordance with one embodiment of the present invention.

After each updating of the address, as described in conjunction with FIG. 8 above, DQM logic 710 calculates a current start-mask and end-mask. DQM logic 710 then determines if the current individual address is for the final wide-word of the memory write operation. When the value of (BC−1) is greater than or equal to 8, the memory write operation is not on the final wide-word of the memory write operation, and memory address generator 230 then sends the current start-mask to SDRAM interface 250 for masking bytes in the current wide-word of the memory write operation. It is noteworthy that the start-mask for intermediate wide-words in a multiple wide-word memory write operation equals 00000000 binary.

When the value of (BC−1) is less than 8, the memory write operation is on the ending wide-word of the memory write operation, and memory address generator 230 then sends the current end-mask to SDRAM interface 250 for masking bytes in the ending wide-word.

Thus, in cases where the memory write operation takes place within more than one wide-word, DQM logic 710 may derive the required values of DQM for an unaligned transfer by shifting bit patterns by amounts calculated from the current values of the individual addresses.

Referring now to FIG. 8, an exemplary memory configuration map shows a derivation of a single mask using a bitwise-or function, in accordance with one embodiment of the present invention. The example shown in FIG. 8 may be used to explain how, in the special cases where the memory write operation takes place within only one wide-word, DQM logic 710 may derive the single required value of DQM.

DQM logic 710 derives the single required value of DQM by first calculating a start-mask, then calculating an end-mask, and finally bitwise-or'ing the start-mask with the end-mask. The resulting bit-or-mask will be the required value for data mask byte DQM. DQM logic 710 calculates the start-mask and end-mask the same way as was described above in conjunction with FIG. 7.

In the FIG. 8 example, DQM logic 710 generates start-mask 802 by taking the 16 bit word FF00 hex (1111111100000000 binary) and shifting it logically to the right by the binary number contained in DBA[2:0], 010. The least-significant 8 bits of the result is 11000000, shown as start-mask 802. DQM logic 710 next generates end-mask 804. In the FIG. 8 embodiment, DQM logic 710 shifts the 16 bit word 007F hex (0000000001111111 binary) logically to the right by the binary number which is the sum of (BC−

1)[2:0] and DBA[2:0]. In the FIG. 8 example, (BC−1)[2:0]= 010, and DBA[2:0]=010, and the sum equals 100. Shifting 0000000001111111 binary to the right 100 times yields xxxx000000000111, giving a value for end-mask 804 of 00000111.

DQM logic 710 then determines that exemplary unaligned memory write operation 850 occurs within the boundaries of a single wide-word by testing whether ((BC−1)+DBA[2:0]) is less than 8 hex, and then finding that the answer is yes. Finally, DQM logic 710 takes a bitwise-or of the start-mask and end-mask. This bit-or-mask is used as the value of data byte mask DQM. In the FIG. 8 example, the bitwise-or of start-mask 802 and end-mask 804 is bit-or-mask 806. Note that those locations within bit-or-mask 806 with values equal to 1 correctly correspond to the data bytes where writing should be inhibited in exemplary unaligned memory write operation 850.

Thus, in cases where the memory write operation takes place within one single wide-word, DQM logic 710 may derive the single required value of DQM for an unaligned transfer by shifting bit patterns to create start-mask and end-mask as shown in conjunction with FIG. 7, and then bitwise-or'ing the start-mask and end-mask.

Figure 9:
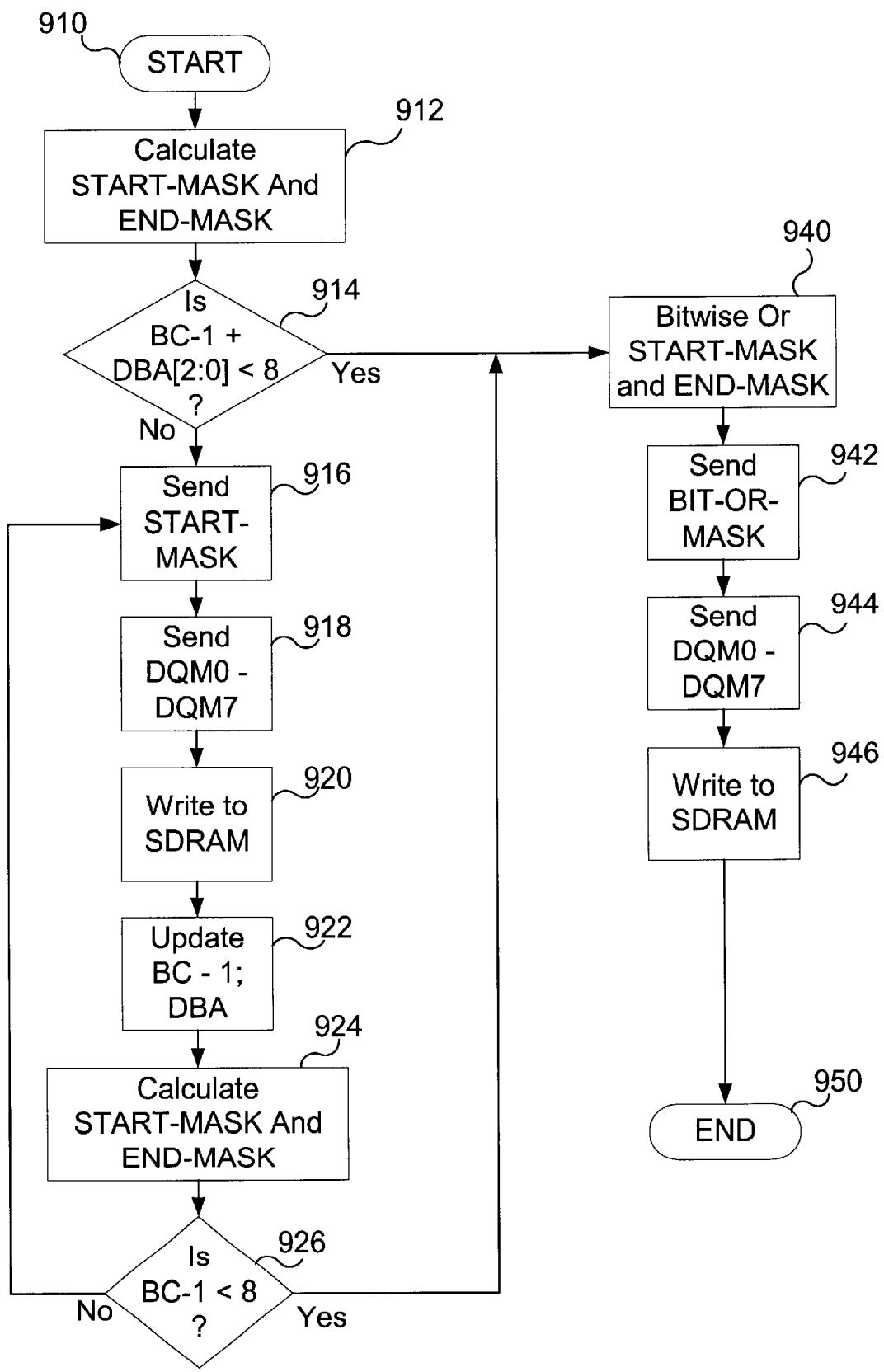
FIG. 9 is a flowchart showing method steps for writing individual bytes in a wide-word memory, in accordance with one embodiment of the present invention.

Referring now to FIG. 9, a flowchart showing method steps for writing individual bytes in a memory is shown, in accordance with one embodiment of the present invention. The FIG. 9 process starts, in step 910, when memory arbitrator 210 sends memory address generator 230 a 32-bit memory address. In step 912, DQM logic 710 of memory address generator 230 calculates the first start-mask by shifting 1111111100000000 to the right by DBA[2:0], and then taking the eight least-significant bits as data mask byte DQM. Also in step 912, DQM logic 710 of memory address generator 230 calculates the first end-mask by shifting 0000000001111111 by (BC−1)[2:0]+DBA[2:0], and then taking the eight least-significant bits as the data mask byte DQM. Then, in step 914, DQM logic 710 of memory address generator 230 determines whether the memory write operation includes only one, or more than one, wide-words by testing to see if ((BC−1)+DBA[2:0]) is less than 8.

If the answer is no, then step 914 exits via the no branch and begins a multiple wide-word memory write operation. In step 916, memory address generator 230 sends the current start-mask to SDRAM interface 250, along with the current individual address. In step 918, SDRAM interface 250 applies this start-mask as data mask bits DQM0 370 through DQM7 384. In step 920, SDRAM interface 250 uses the current individual address and the data mask bits DQM0 370 through DQM7 384 to perform four 16-bit data write operations to external SDRAM, with two of the data mask bits being asserted during each 16-bit data write operation.

After SDRAM interface 250 has performed the four 16-bit data write operations, memory address generator 230 then, in step 922, updates (BC−1) by subtracting (DBA[2:0] *+1) from the current value of (BC−1). Also, in step 922, memory address generator 230 updates DBA by adding (DBA[2:0]*+1) to the current value of DBA. After updating these values, then, in step 924, DQM logic 710 calculates the current values of start-mask and end-mask.

Memory address generator 230 then, in step 926, determines whether (BC−1) is less than 8 (i.e. whether the next wide-word is an ending wide-word). If the answer is no, then the FIG. 9 process exits via the no branch of step 926, and the sub-process of memory writing with the current start-mask repeats, starting at step 916.

Conversely, if the answer is yes, then the FIG. 9 process exits via the yes branch of step 926. In that event, in step 940, DQM logic 710 of memory address generator 230 performs a bitwise-or function on the current start-mask and end-mask. The least-significant eight bits of the resulting word form the bit-or-mask for the memory write operation. Memory address generator 230 then, in step 942, sends the bit-or-mask to SDRAM interface 250 along with the individual address. In step 944, SDRAM interface 250 applies the bit-or-mask as data mask bits DQM0 370 through DQM7 384. In step 946, SDRAM interface 250 uses the individual address and the data mask bits DQM0 370 through DQM7 384 to perform four 16-bit data write operations to external SDRAM, with two of the data mask bits being asserted during each 16-bit data write operation. Because this is the last wide-word of the current memory write operation, the FIG. 9 process then ends in step 950.

The above discussion assumes that the FIG. 9 process exits decision step 914 via the no branch, i.e. that the memory write operation covers multiple wide-words. Conversely, if the FIG. 9 process exits decision step 914 via the yes branch, this means that the memory write operation covers only one wide-word. In that event, in step 940, DQM logic 710 of memory address generator 230 performs a bitwise-or function on the current start-mask and end-mask. The least-significant eight bits of the resulting word form the bit-or-mask for the memory write operation. Memory address generator 230 then, in step 942, sends the bit-or-mask to SDRAM interface 250 along with the individual address. In step 944, SDRAM interface 250 applies the bit-or-mask as data mask bits DQM0 370 through DQM7 384. In step 946, SDRAM interface 250 uses the individual address and the data mask bits DQM0 370 through DQM7 384 to perform four 16-bit data write operations to external SDRAM, with two of the data mask bits being asserted during each 16-bit data write operation. Because there is only one wide-word considered in the current memory write operation, the FIG. 9 process then ends in step 950.

In one embodiment of the FIG. 9 process, the calculations of the values of DQM are performed in hardware. In alternate embodiments the calculations of the values of DQM may be performed by software running on a processor. Similarly, in one embodiment of the FIG. 9 process, the calculations necessary in updating the values of DBA and BC−1 are performed in hardware. In alternate embodiments these calculations may be performed by software running on a processor.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A memory controller configured for writing to specific bytes, comprising:

an address for a memory including an individual byte address, wherein said address includes a byte-count-minus-one; and at least one data mask bit for inhibiting data write operations to individual bytes within said memory when using said address.

2. The memory controller of claim 1 wherein said memory controller is embedded within a digital audio and video decoder.

3. The memory controller of claim 1 wherein said memory controller updates said individual byte address for subsequent word writes.

4. The memory controller of claim 3 wherein said memory controller updates said individual byte address by adding a one's complement of three least-significant-bits of said individual byte address plus one.

5. The memory controller of claim 1 wherein said byte count minus one is updated by subtracting a one's complement of three least-significant-bits of said individual byte address plus one.

6. The memory controller of claim 1 wherein said data mask bits are organized into a start-mask.

7. The memory controller of claim 6 wherein said start-mask is calculated by logically shifting a first bit pattern by a first shifting amount.

8. The memory controller of claim 7 wherein said first bit pattern is 1111111100000000.

9. The memory controller of claim 7 wherein said first shifting amount is equal to three least-significant-bits of said individual byte address.

10. The memory controller of claim 6 wherein said data mask bits are further organized into an end-mask.

11. The memory controller of claim 10 wherein said end-mask is calculated by logically shifting a second bit pattern by a second shifting amount.

12. The memory controller of claim 11 wherein said second bit pattern is 0000000001111111.

13. The memory controller of claim 11 wherein said second shifting amount is equal to three least-significant-bits of said byte-count-minus-one.

14. The memory controller of claim 10 where said data mask bits for a single-word memory address operation are calculated by taking a bitwise-or of said start-mask and said end-mask.

15. A method for operating a memory controller for writing to specific bytes in a memory, comprising the steps of:
designating said specific bytes in said memory using an address including an individual byte address, wherein said address includes a byte-count-minus-one; and
inhibiting data write operations to individual bytes within said memory using at least one data mask bit when using said address.

16. The method of claim 15 wherein said memory controller is embedded within a digital audio and video decoder.

17. The method of claim 15 wherein said memory controller updates said individual byte address for subsequent word writes.

18. The method of claim 17 wherein said memory controller updates said individual byte address by adding a one's complement of three least-significant-bits of said individual byte address plus one.

19. The method of claim 15 wherein said byte count minus one is updated by subtracting a one's complement of three least-significant-bits of said individual byte address plus one.

20. The method of claim 15 wherein said data mask bits are organized into a start-mask.

21. The method of claim 20 wherein said start-mask is calculated by logically shifting a first bit pattern by a first shifting amount.

22. The method of claim 21 wherein said first bit pattern is 1111111100000000.

23. The method of claim 21 wherein said first shifting amount is equal to three least-significant-bits of said individual byte address.

24. The method of claim 20 wherein said data mask bits are further organized into an end-mask.

25. The method of claim 24 wherein said end-mask is calculated by logically shifting a second bit pattern by a second shifting amount.

26. The method of claim 25 wherein said second bit pattern is 0000000001111111.

27. The method of claim 25 wherein said second shifting amount is equal to three least-significant-bits of said byte-count-minus-one.

28. The method of claim 24 where said data mask bits for a single-word memory address operation are calculated by taking a bitwise-or of said start-mask and said end-mask.

29. A memory controller configured for writing to specific bytes in a memory, comprising:
means for designating said specific bytes in said memory using an address including an individual byte address; and
means for inhibiting data write operations to individual bytes within said memory using at least one data mask bit when using said address.

30. A computer-readable medium comprising program instructions for operating a memory controller for writing to specific bytes in a memory, by performing the steps of:
designating said specific bytes in said memory using an address including an individual byte address, wherein said address includes a byte-count-minus-one; and
inhibiting data write operations to individual bytes within said memory using at least one data mask bit when using said address.

* * * * *